(12) United States Patent
Cockrell et al.

(10) Patent No.: US 6,272,215 B1
(45) Date of Patent: Aug. 7, 2001

(54) INTELLIGENT CALL REDIRECTION

(75) Inventors: Jane E. Cockrell, Denver, NC (US); Marius J. Gudelis, Matawan; Barry S. Seip, New Providence, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/125,095
(22) PCT Filed: Dec. 5, 1997
(86) PCT No.: PCT/US97/21533
 § 371 Date: Jul. 19, 1999
 § 102(e) Date: Jul. 19, 1999
(87) PCT Pub. No.: WO98/25394
 PCT Pub. Date: Jun. 11, 1998

Related U.S. Application Data
(60) Provisional application No. 60/031,486, filed on Dec. 6, 1996.

(51) Int. Cl.[7] .................................................... H04M 7/00
(52) U.S. Cl. .......................... 379/219; 379/220; 379/221
(58) Field of Search .................................. 379/219, 220, 379/221

(56) References Cited

U.S. PATENT DOCUMENTS

| | | |
|---|---|---|
| 4,766,604 | 8/1988 | Axberg . |
| 4,825,460 | 4/1989 | Carter et al. . |
| 4,901,341 | 2/1990 | Carter et al. . |
| 4,933,967 | 6/1990 | Lo et al. . |
| 4,972,461 | 11/1990 | Brown et al. . |
| 5,017,917 | 5/1991 | Fisher et al. . |
| 5,036,533 | 7/1991 | Carter et al. . |
| 5,131,024 * | 7/1992 | Pugh et al. . |
| 5,134,647 * | 7/1992 | Pugh et al. . |
| 5,153,907 * | 10/1992 | Pugh et al. . |
| 5,345,497 * | 9/1994 | Amoroso et al. . |
| 5,381,465 * | 1/1995 | Carter et al. . |
| 5,414,754 * | 5/1995 | Pugh et al. . |
| 5,418,844 * | 5/1995 | Morrisey et al. ..................... 379/207 |
| 5,473,679 * | 12/1995 | La Porta et al. ..................... 379/201 |
| 5,483,582 * | 1/1996 | Pugh et al. . |
| 5,566,235 * | 10/1996 | Hetz ..................................... 379/201 |
| 5,570,417 * | 10/1996 | Byers ..................................... 379/115 |
| 5,579,383 * | 11/1996 | Bales et al. . |
| 5,583,564 | 12/1996 | Rao et al. . |
| 5,606,595 * | 2/1997 | Ejzak ..................................... 379/349 |

FOREIGN PATENT DOCUMENTS
0 376 545 A2 * 7/1990 (EP) .

* cited by examiner

Primary Examiner—Ahmad Matar
Assistant Examiner—Hector Agdeppa
(74) Attorney, Agent, or Firm—Morgan & Finnegan, LLP.

(57) ABSTRACT

An intelligent method is disclosed for handling call redirection to an external service provider (ESP) for subsequent call processing. In one embodiment, a network database (30) is queried to determine whether the calling party station (5) has pre-selected an ESP for subsequent call processing. In the event that the calling party station has pre-selected an ESP, the call is automatically redirected to the pre-selected ESP; no caller input is required. If, however, the calling party station has not pre-selected an ESP, an announcement is played to the calling party offering a menu of available ESPs. To accept the offer, the caller must explicitly respond to the offer using, e.g., DTMF signaling. The call is then redirected on a per-call basis in accordance with the calling party's selection.

21 Claims, 1 Drawing Sheet

INTELLIGENT CALL REDIRECTION

This application claims the benefit of U.S. Provisional Application No. 60/031,486, filed Dec. 6, 1996.

TECHNICAL FIELD

This invention relates generally to a method for redirecting calls to an external services provider (ESP) for subsequent call processing and, more particularly, to an intelligent method for redirecting calls to an ESP for the provision of voice messaging.

BACKGROUND

It is known in the art to provide a variety of call services in addition to basic call completion. One such service is automatic voice messaging in which a call encountering a busy or ring-no-answer condition is redirected to a voice messaging platform where the caller can record a message for the called party. The called party is then provided with a message waiting indicator (MWI) in the form of a stutter dial tone or a flashing light on the called party's telephone and, the called party, upon detection of the MWI, can dial into the platform to retrieve the recorded message from his/her mailbox.

SUMMARY OF INVENTION

An exemplary method for redirecting a call involving a calling party station to an external service provider (ESP) for subsequent call processing in accordance with the present invention includes: (1) determining whether the calling party station has pre-selected an ESP for subsequent call processing; (2) if the calling party station has pre-selected an ESP, redirecting the call to the pre-selected ESP; and (3) if the calling party station has not pre-selected an ESP, prompting a calling party at the calling party station to select an ESP and, redirecting the call to the ESP as selected by the calling party.

Other and further aspects of the present invention will become apparent during the course of the following description and by reference to the attached drawings.

DETAILED DESCRIPTION

Figure 1:
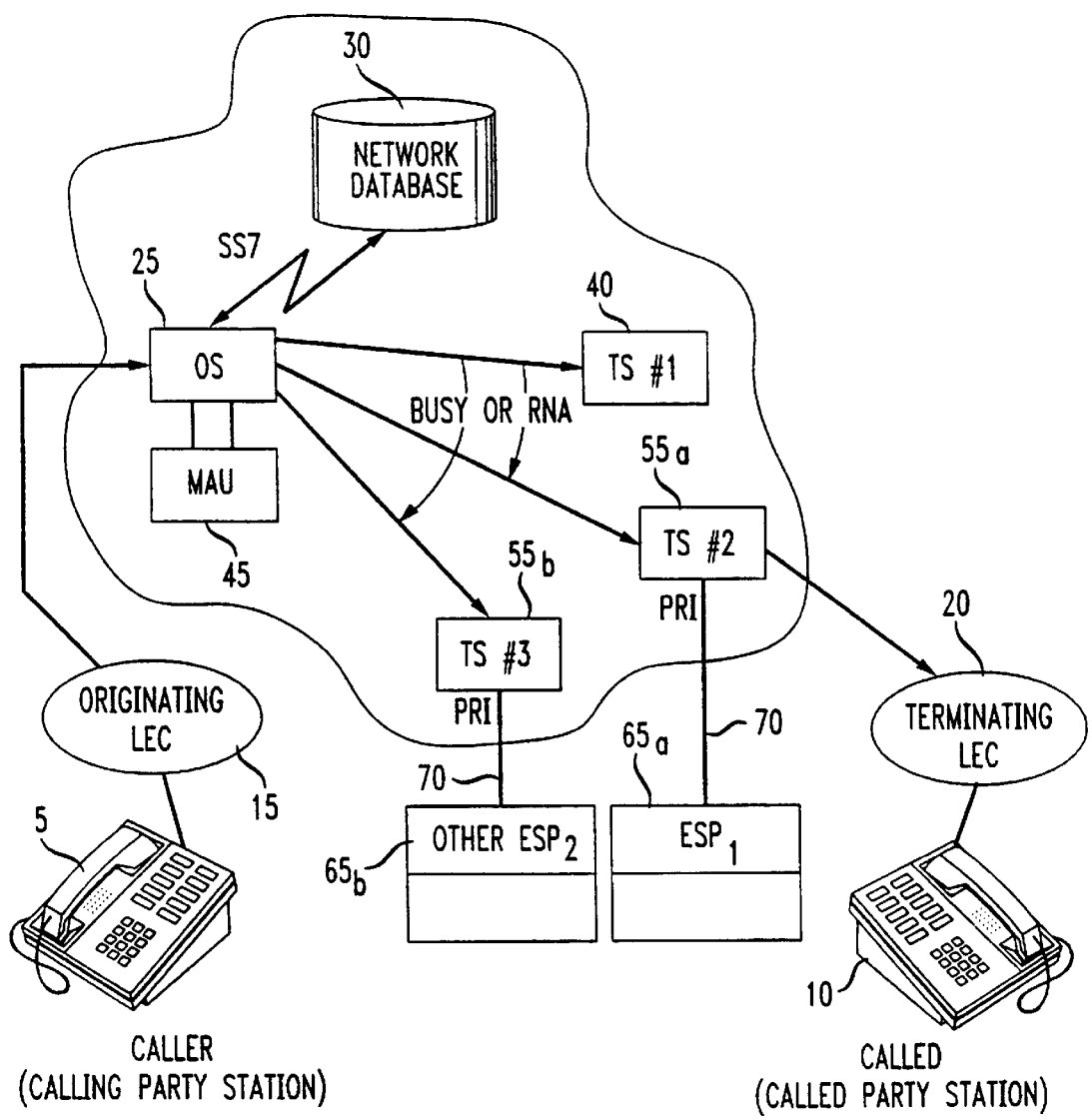
FIG. 1 is a block diagram illustrating a system architecture implementing the intelligent call redirection feature of the present invention.

Referring now to the drawings wherein like reference numerals refer to like parts, FIG. 1 is a block diagram illustrating a system architecture implementing the intelligent call redirection feature of the present invention. Although not meant to be limiting, the present invention is described in connection with redirection of a call to an external service provider for the provision of voice messaging.

A. Network Architecture Elements

1. Signaling System No. 7 (SS7) In the architecture of FIG. 1, end-to-end SS7 connectivity for transmitting out-of-band calling activity is assumed. For example, SS7 interfaces are provided between: (1) the originating Local Exchange Carrier (LEC) switch 15 and the Originating Switch 25 (OS); (2) the terminating LEC switch 20 and the Terminating Switch 40 (TS); (3) the OS 25 and the TS 40. The SS7 network also supports queries and responses between the OS 25 and the Network Database 30.

2. Originating Switch (OS)

Upon call initiation, the originating LEC 15 uses the calling party 5 number to determine the automatic number identification (ANI) for the call. The originating LEC 15 then generates an Initial Address Message (IAM) containing the ANI and the calling party number together with any privacy indicators and the dialed number (DN) of the called party station 10, and sends the IAM to the OS 25 over an SS7 data link. In the architecture of FIG. 1, the OS 25 is an AT&T 4ESS™ toll switch, the details of which are well known in the art.

On each call through the network, the OS 25 queries the Network Database 30 using an SS7 Transaction Capabilities (TCAP) Begin Message to determine both "whether" to offer voice messaging on the call and, "how" to offer it. The TCAP Begin Message contains, among other things: (1) the calling station 5 ANI or calling party number and (2) the dialed number of the called station 10.

3. Network Database

The Network Database 30 contains customer-specific data regarding the voice messaging service. This information is used to determine both "whether" to offer voice messaging on the call and "how" to offer it. The Network Database 30 determines whether to invoke voice messaging based on the caller's service type or the call type (e.g., international calls may not be eligible for voice messaging). The Network Database 30 also determines the service preferences and options of the calling and called parties (5, 10) from the ANI or calling party number and the DN received from the OS and, in so doing, determines "how" to offer voice messaging on the call.

In accordance with the present invention, there are two modes of handling call redirection to an ESP such as a voice messaging provider—namely, an automatic mode and an on-request mode. ANIs or calling party numbers which are listed in the Network Database 30 as having pre-selected an ESP (e.g., 65a or 65b) for voice messaging (i.e., calling party numbers that have a preestablished relationship with an ESP) are assigned to the automatic mode. The on-request mode is used for ANIs or calling party numbers which have not pre-selected an ESP (65a,b). In the automatic mode, a Monitoring and Announcement Unit (MAU) 45 (described fully below) monitors call progress signals (e.g., in-band RNA and out-of-band user or network busy). Calls encountering a busy or RNA are automatically redirected to the pre-selected ESP (65a,b) after the MAU plays an announcement to the calling party 5 (e.g., "To leave a message, please wait."). Because the automatic mode does not require any caller interaction, it provides rotary dial customers access to an ESP and thus, to call services such as voice messaging. In the on-request mode, upon busy or RNA, the MAU 45 will play an announcement to the calling party offering a menu of available ESPs (65a,b) (e.g., "To leave a message press 1 for AT&T Messaging, press 2 for ABC messaging, press 3 for XYZ messaging."). The MAU 45 will then monitor for a response from a caller at the calling party station 5. The caller can select an ESP (on a per-call basis) by pressing the digit on the touch-tone keypad of his telephone or, alternatively, speaking a digit corresponding to the desired ESP (65a,b). Entry of an ESP selection digit will initiate call redirection to the desired ESP.

Additional service preferences and options include: (1) disable voice messaging (as specified by the calling or called party 5, 10) and (2) customized rings (the number of rings that defines a RNA condition and is the larger of the value specified by the ANI or the DN, or otherwise a default value). With respect to the disable option, a DN corresponding to a called party station 10 which is not conducive to voice messaging could thus disable voice messaging on all calls made to that number. Examples of such DNs include those associated with payphones, facsimile machines and computer dial-in numbers.

If the Network Database 30 decides to invoke voice messaging on the call, it forwards instructions to the OS 25 (via a TCAP Instruction Message) to route the call through the MAU 45. The Network Database 30 also forwards to the OS 25 via the same Instruction Message: (1) a Redirection Feature ID (i.e., automatic mode or on-request mode); (2) a timer value that corresponds to the number of rings that defines a RNA condition; (3) an ESP identifier (for automatic mode the caller's pre-selected ESP identifier is returned; for the on-request mode, a "best-guess" {e.g., entirely random} ESP identifier is returned); (4) a Redirection Number (RN) which is used to redirect the call to the ESP; and (5) an indication of which ESPs support voice messaging for calls originating from the NPA-NXX of the caller's ANI.

The OS 25 then sends the information contained in the TCAP instruction message to the MAU 45, routes the call through the MAU 45 and sets up the call to the TS 40 associated with the DN.

4. Monitoring and Announcement Unit (MAU)

When the MAU 45 is invoked on a call, the call path is "hair-pinned" through the MAU 45. As indicated above, the MAU 45 monitors for various in-band triggers such as call progress signals (e.g., user busy or RNA) and entry of DTMF or voice signals by the caller (e.g., entry by the caller of an ESP selection digit from the touch-tone keypad of the calling station 5 or, alternatively, entry by the caller of an ESP selection digit by speaking the digit into the transceiver of the calling station 5). The MAU 45 also uses out-of-band message processing for the detection of out-of-band triggers such as call progress signals (e.g., network busy). In response to trigger detection, the MAU 45 plays various announcements (e.g., service offerings) to the caller at the calling station 5.

When a call is hair-pinned through the MAU 45, the OS 25 actually "sees" two separate calls: (1) an "incoming" call from the calling party 5 to the MAU 45 and (2) an "outgoing" call from the MAU 45 to the called party 10. The "incoming call" is referred to as the "P1" leg, and the "outgoing call" is referred to as the "P2" leg.

Although the OS 25 "sees" two separate calls, the MAU 45 knows that the P1 and P2 legs are tied together. The MAU 45 software has both a "Merge" capability and "Redirect Call" capability. A "Merge" is used to tie together a P1 and P2 leg when both legs are already established. For example, a merge is used to tie together (1) a first call between a calling party 5 and the OS 25 and (2) a second call between the OS 25 and the called party 10, as soon as the called party 10 answers the call. A "Redirect Call" is used to tie together a P1 leg with a P2 leg which has yet to be established. For example, when a call being monitored by the MAU 45 is to be redirected to an ESP (65a,b), a Redirect Call is performed. In such instances, the following steps are executed: (1) the outgoing trunk (P2) is removed; (2) the MAU 45 instructs the OS 25 to redirect the call to the ESP (65a,b); and (3) the MAU 45 is disabled (i.e., the MAU 45 is no longer included in the call).

5. Terminating Switch (TS) for the ESP

If the call is redirected to an ESP (65a,b), the TS (55a,b) for the ESP uses Call Redirection Service over a Primary Rate Interface 70 (PRI) to terminate the call at the ESP. After the calling party records a message and goes on-hook, the network tears down the call path.

To initiate call set-up between the OS 25 and the selected ESP (65a,b), the OS 25 first sends an ISUP IAM message to the TS (55a,b) servicing the ESP (65a,b). The TS (55a,b) then converts the IAM message into a Set-Up message for transmission to the ESP (65a,b). Signaling between the TS (55a,b) and the ESP (65a,b) is via an ISDN D channel. The Set-Up message includes the following information: the ANI, the RN and the DN together with the "reason for redirection" (e.g., no answer or busy). The reason for redirection can be used by the ESP (65a,b) to vary the timing of message delivery (e.g., if the reason for redirection was busy, the ESP (65a,b) would want to commence forced delivery sooner than if the reason for redirection was no answer).

The ESP (65a,b) then sends (1) a Call Proceeding message to the TS (55a,b) which maps the message into a Progress message that is sent to the OS 25 and (2) a Connect message to the TS (55a,b) which is mapped into an Answer message sent to the OS 25. The TS (55a,b), in turn, sends a Connect Acknowledge message to the ESP (65a,b) which is then prepared to receive the call. Upon receiving an Answer message, the OS 25 cuts-through the call to the TS (55a,b), and hence, to the ESP (65a,b), where the caller 5 can record a message for the originally called party 10 number.

B. Exemplary Call Flows

Three call flow scenarios are presented below: (1) automatic mode voice messaging (pre-selected ESP); (2) on-request mode voice messaging—only one ESP; and (3) on-request mode voice messaging—multiple ESPs.

1. Automatic Mode Voice Messaging (pre-selected ESP)

a. The OS 25 receives a call from the LEC 15.

b. The OS 25 queries the Network Database 30 (the query message includes the caller's ANI and the DN). The Network Database 30 contains information about the calling party station and the called party station (5, 10), and retrieves this information using the received ANI and DN, respectively.

c. The Network Database 30 determines, based on the caller's service type and the call type, whether to invoke MAU 45 to assist in redirection to an ESP for subsequent call processing such as voice messaging. If the foregoing indicates that the MAU 45 is to be invoked on the call, the Network Database 30 also determines the preferences and options for the calling and called parties. The following preferences and options are available: (1) Automatic Mode Voice Messaging (ESP pre-selected by calling party); (2) On-Request Mode Voice Messaging (ESP not pre-selected by calling party); (3) Disable Voice Messaging (as specified by the calling or called party); and (4) Customized rings (the number of rings defining a RNA condition as also specified by the calling or called party).

d. If the MAU 45 is to be invoked on the call, the Network Database 30 returns a response to the OS 25 which includes: (1) an invoke MAU 45 parameter; (2) the Redirection Feature ID (either automatic or on-request mode voice messaging; as described below, the on-request mode Feature ID may also depend upon whether a single or multiple ESPs are available); (3) the RNA Timer value; (4) the ESP ID (in the Network Database 30, an ESP ID is associated with every ANI that has pre-selected an ESP. For those ANIs that have not pre-selected an ESP and have not disabled call redirection for voice messaging, the Network Database 30 will return the only available ESP ID in the event that a single ESP is available and a "best-guess" ESP ID in the event that multiple ESPs are available); (5) the Redirection Number (RN) (the Network Database 30 will determine the routing to the ESP based on translations of the NPA-NXX of the dialed number 10); and (6) an indication of which ESPs support voice messaging for calls originating from the NPA-NXX of the dialed number 10.

e. OS 25 routes the call through the MAU 45 to the TS 40 and passes the information obtained from the Network Database 30 to the MAU 45. The MAU 45 saves the following information obtained from the Network Database 30 as per call data: ESP ID, RN, RNA timer value, and indicator of ESP support. In addition, the MAU stores the ANI and Calling Party Number (CPN) with privacy indicators, and the DN.

f. If the MAU 45 detects that the call is answered, the MAU 45 instructs the OS 25 to merge the two legs of the call and disable the MAU 45.

g. If the MAU 45 detects in-band ringing, the MAU 45 starts a RNA timer. If the MAU 45 detects in-band/out-of-band user busy, or out-of-band network busy, or the RNA timer expires and the Feature ID indicates "Automatic Mode", then the MAU 45 plays the Automatic Mode Point of Sale Announcement (POSA). For example: "To leave a message, please wait." Thus, an automatic mode customer need not enter any digits to effect call redirection.

h. If the caller 5 remains on the call after the Automatic Mode POSA is complete, the MAU 45 performs the following steps to redirect the call: (1) passes the RN along with the ANI and CPN with presentation indicators to the OS 25; (2) instructs the OS 25 to redirect the call to the ESP platform (65a,b) using the RN; and (3) instructs the OS to remove the MAU 45 from the call and merge the two legs of the call. In the automatic mode, a built-in delay period between the end of the POSA and the start of rerouting is used to provide the caller 5 with a reasonable period of time in which to decline voice messaging (i.e., to hang up). This delay period also avoids the expense incurred by the network of redirecting the call unnecessarily.

i. The OS 25 redirects the call to the appropriate ESP platform (65a,b) using the RN and passes along the ANI and CPN together with associated privacy indicators and the DN.

j. When the TS (55a,b) serving the ESP platform (65a,b) receives the call, the TS (55a,b) sends the ESP platform (65a,b) an ISDN Q.931 SETUP Message which includes the following information elements:
(1) Calling Party Number (CPN)=caller's (5) ANI or CPN with privacy indicator
(2) Called Party Number (CdPN)=Redirection Number (RN) of ESP
(3) Redirecting Number=Originally Dialed Number (DN) and reason for redirection (e.g., no answer, user busy, network busy).

k. If the caller (5) stays on the line, the ESP platform (65a,b) answers the call.

l. Once the call is answered by the ESP platform (65a,b) (i.e., the ESP platform returns Answer Supervision), the call flow in the Network is identical to a POTS call.

m. The ESP (65a,b) uses the Redirecting Number (the original DN) as the address of the called party's mailbox and, plays a greeting to the caller.

n. After the greeting, the caller leaves a message.

o. The platform (65a,b) notifies the called party 10 that a message is in the called party's mailbox by a message waiting indicator (e.g., a lamp on the called party's phone) or via a phone call to the message recipient.

2. On-Request Mode Voice Messaging—Only One ESP

Steps a–f are the same as for Automatic Mode Voice Messaging.

g. If the MAU 45 detects in-band ringing, the MAU 45 starts the RNA timer and begins monitoring for caller 5 entered DTMF or spoken digits corresponding to an ESP (65a,b). Digit collection is also enabled for in-band/out-of-band busy. An ESP selection digit can be entered by the caller any time after ringing or busy has been detected by the MAU 45 and before answer to immediately redirect the call to the ESP (65a,b) rather than waiting for expiration of the RNA timer or completion of the POSA (see Step g.', below).

g.' If the MAU 45 detects in-band/out-of-band busy or the RNA timer expires and the Feature ID indicates "On-Request Mode Voice Messaging—only one ESP", the MAU 45 plays the On-Request Mode—Only One ESP POSA. The POSA may be, for example, "To leave a message, press or say 1 for AT&T Messaging."

h. If the caller 5 presses or speaks an ESP selection digit, the MAU 45 checks the indicator of ESP support to see if the digit is a valid ESP selection digit. If the caller presses a valid ESP selection digit, the MAU 45 then performs the following steps to redirect the call: (1) passes the RN together with the ANI and CPN with presentation indicators to the OS 25; (2) instructs the OS 25 to redirect the call to the ESP platform (65a,b) using the RN; (3) instructs the OS 25 to remove the MAU 45 from the call and merge the two legs of the call.

The remaining steps are the same as for Automatic Mode Voice Messaging.

3. On-Request Mode Voice Messaging—Multiple ESPs

Steps a–f are the same as for Automatic Mode Voice Messaging.

g. Same as for On-Request Mode Voice Messaging—Only One ESP g.' If the MAU 45 detects in-band/out-of-band busy or the RNA timer has expired and the Feature ID indicates "On-Request Mode Voice Messaging—Multiple ESPs", the MAU 45 plays the On-Request Mode Multiple ESP POSA.

The POSA may be, for example, "To leave a message, press or say 1 for AT&T Messaging, press or say 2 for ABC messaging, press or say 3 for XYZ messaging."

h. If the caller presses or speaks a valid ESP selection digit, as determined by the indicator of ESP support, then one of two scenarios result:
(1) if the ESP selection digit corresponds to the ESP ID stored in the MAU 45, then the MAU 45 performs the following steps: (a) passes the RN together with the ANI and CPN with presentation indicators to the OS; (b) instructs the OS to redirect the call to the ESP platform using the RN; and (c) instructs the OS to remove the MAU 45 from the call and merge the two legs of the call, or
(2) if the ESP selection digit does not correspond to the ESP ID stored in the MAU 45, then the MAU 45 performs the following steps: (a) passes the ANI and CPN with presentation indicators to the OS; (b) instructs the OS to query the Network Database 30 to obtain the RN of the ESP selected and redirect the call; and (c) instructs the OS to remove the MAU 45 from the call and merge the two legs of the call.

The remaining steps are the same as for Automatic Mode Voice Messaging.

The many features and advantages of the present invention are apparent from the detailed specification, and thus, it is intended by the appended claims to cover all such features and advantages of the invention which fall within the true spirit and scope of the present invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

We claim:

1. A method for handling redirection of a call involving a calling party station to an external service provider (ESP) for subsequent call processing, comprising the steps of:
   determining whether the calling party station has pre-selected an ESP for the subsequent call processing;
   if the calling party station has pre-selected an ESP, redirecting the call to the pre-selected ESP;
   if the calling party station has not pre-selected an ESP, prompting a caller at the calling party station to select an ESP and, redirecting the call to the selected ESP,
   wherein the determining step occurs before detection of a redirection trigger and the prompting step occurs after detection of the redirection trigger.

2. The method of claim 1 wherein the determining step includes the step of transmitting call origination information to a database containing customer specific data regarding the subsequent call processing.

3. The method of claim 1 wherein the step of redirecting the call to the pre-selected ESP is in direct response to the redirection trigger.

4. The method of claim 1 wherein the step of redirecting the call to the selected ESP is in direct response to entry of an ESP selection digit by a caller at the calling party station.

5. The method of claim 1 wherein the subsequent call processing is voice messaging and the redirection trigger is a busy or ring-no-answer condition.

6. The method of claim 1 further comprising the step of determining whether either the calling party station or the called party station has specified a number of unanswered rings that constitutes a ring-no-answer condition for voice messaging.

7. The method of claim 6 wherein the determining steps include the step of transmitting call origination information and call destination information to a database containing customer specific data regarding voice messaging.

8. A method for handling redirection of a call involving a calling party station to an external service provider (ESP) for subsequent call processing, comprising the steps of:
   determining whether the calling party station has pre-selected an ESP for the subsequent call processing;
   determining whether the calling party station has disabled the subsequent call processing on calls made from the calling party station;
   determining whether the called party station has disabled the subsequent call processing on calls made to the called party station;
   when the calling party station has pre-selected an ESP, redirecting the call to the pre-selected ESP;
   when the calling party station has not pre-selected an ESP, prompting a caller at the calling party station to select an ESP and, redirecting the call to the selected ESP; and
   when either the calling party station or the called party station has disabled the subsequent call processing, not performing the prompting step and the redirecting steps on the call.

9. The method of claim 8 wherein the determining steps include the step of transmitting call origination information and call destination information to a database containing customer specific data regarding the subsequent call processing.

10. The method of claim 8 wherein the determining steps occur before detection of a redirection trigger and the prompting step occurs after detection of the redirection trigger.

11. The method of claim 8 wherein the step of redirecting the call to the pre-selected ESP is in direct response to a call progress redirection trigger.

12. The method of claim 8 wherein the step of redirecting the call to the selected ESP is in direct response to entry of an ESP selection digit by a caller at the calling party station.

13. The method of claim 10 wherein the subsequent call processing is voice messaging and the redirection trigger is a busy or ring-no-answer condition.

14. The method of claim 13 further comprising the step of determining whether either the calling party station or the called party station has specified a number of unanswered rings that constitutes a ring-no-answer condition for voice messaging.

15. The method of claim 14 wherein the determining steps include the step of transmitting call origination information and call destination information to a database containing customer specific data regarding voice messaging.

16. A method for handling redirection of a call involving a calling party station and a called party station to a voice messaging provider, comprising the steps of:
   transmitting call origination information to a database to determine whether the calling party station has pre-selected a voice messaging provider;
   receiving a response from the database indicating whether the calling party station has pre-selected a voice messaging provider;
   detecting a busy or ring-no-answer condition on the call;
   when the calling party station has pre-selected a voice messaging provider, automatically redirecting the call on busy or ring-no-answer to the voice messaging provider;
   when the calling party station has not pre-selected a voice messaging provider, prompting a caller at the calling party station on busy or ring-no-answer to select a voice messaging provider for the call;
   monitoring the call for the caller's selection of a voice messaging provider;
   redirecting the call in accordance with the caller's selection of a voice messaging provider.

17. A method for handling redirection of a call involving a calling party station to an external service provider (ESP) for subsequent call processing, comprising the steps of:
   determining whether the calling party station has pre-selected an ESP for the subsequent call processing;
   detecting a call progress redirection trigger; and
   upon detection of the call progress redirection trigger:
   if the calling party station has pre-selected an ESP, redirecting the call to the pre-selected ESP;

if the calling party station has not pre-selected an ESP, prompting a caller at the calling party station to select an ESP and, redirecting the call to the selected ESP.

18. The method of claim 17 wherein the determining step occurs before detection of the call progress redirection trigger.

19. The method of claim 17 wherein the step of redirecting the call to the pre-selected ESP is in direct response to the call progress redirection trigger.

20. The method of claim 17 wherein the step of redirecting the call to the selected ESP is in direct response to entry of an ESP selection digit by a caller at the calling party station.

21. The method of claim 17 wherein the subsequent call processing is voice messaging and the call progress redirection trigger is a busy or ring-no-answer condition.

* * * * *